UNITED STATES PATENT OFFICE.

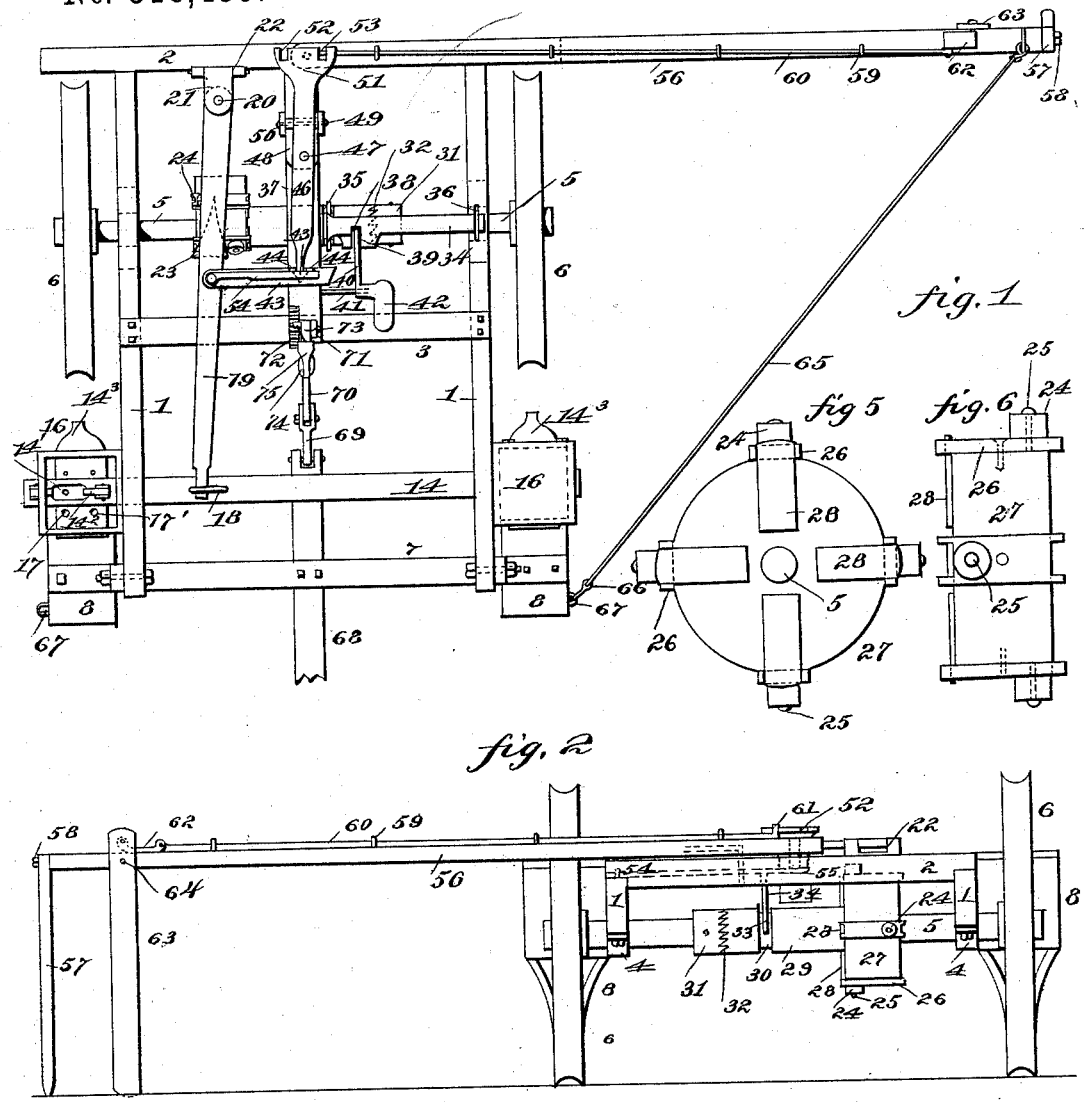

GEORGE P. KUHN, OF BROOKSIDE, ILLINOIS.

CORN-PLANTER.

SPECIFICATION forming part of Letters Patent No. 518,459, dated April 17, 1894.

Application filed December 16, 1893. Serial No. 493,815. (No model.)

*To all whom it may concern:*

Be it known that I, GEORGE P. KUHN, a citizen of the United States, residing at Brookside, in the county of Clinton and State of Illinois, have invented certain new and useful Improvements in Corn-Planters; and I do hereby declare the following to be a full, clear, and exact description of the invention, such as will enable others skilled in the art to which it appertains to make and use the same.

My invention relates to improvements in corn-planters, and the object of my invention is to produce an efficient and easily operated machine of simple and durable construction, light in draft and reliable in operation.

The invention will first be described in connection with the accompanying drawings, and then particularly pointed out in the claims.

In the drawings, Figure 1 is a plan view of a planter embodying my invention. Fig. 2 is a rear end view. Fig. 3 is a rear view of one of the shoes. Fig. 4 is a detail plan view of the end of the reciprocating bar. Figs. 5 and 6 are enlarged detail views.

Referring to the drawings, 1 are the side sills, 2 an end sill and 3 a cross sill arranged as shown and forming the main frame of the planter. To the lower side of each cross sill is attached a boxing 4, in which is journaled a main axle 5 provided with main wheels 6 outside the side sills and fixed to the axle. To the front of the side sills is pivotally attached a shoe beam 7, to each end of which is fixed a shoe or furrow opener 8, each shoe having a vertical recess 9 at its rear end, which is wider near the top of the shoe, the widened part being provided with a pane of some transparent material, preferably of isinglass, as shown at 10. In the widened portion of each recess is pivoted at 11 a swinging lever 12, widened at its lower end. The upper end of each swinging dropper lever 12 is inserted in a slot 13 in a transverse bar 13' forming part of a plate $13^2$ attached to a reciprocating bar 14 which moves in slideways 15 formed at the top of the shoe. On top of each shoe is fixed a seed hopper provided with a lid at 16, as usual.

The ends of the reciprocating bar are each provided with elongated openings 14' and between the reciprocating bar and the transverse bar 13' is loosely held a seed-plate $14^2$ which has an arm $14^3$ projecting through the hopper frame, as will be plain from the drawings.

The seed-plate has two rows of holes 17, 17' and these holes are graduated in size for various kind of seed, so that by adjusting the pivoted point of the seed plate arm, any desired pair of seed dropping holes 17 or 17' may be brought into register with the openings in the reciprocating bar. In this way, the seed is alternately dropped through either the hole 17, or 17' and falls to one side or the other of the swinging dropper bar which being pivoted, as before described will have its widened lower end in contact with the side of the shoe whereby the seed falling through the hole at that time in register with the hopper bottom is held from falling to the ground until the dropper bar is swung to one side by the reciprocating bar, whereupon the seed falls into the furrow made by the shoe, while the other hole in the reciprocating bar comes in register with the bottom of the hopper and the seed for the next hill falls in the recess in the shoe and is stopped by the dropper bar which by that time has swung to the opposite side of the recess.

The reciprocating bar is provided with a loop 18 into which enters the front end of a throw lever 19 pivoted at 20 to a supporting plate 21 hinged to a bracket 22 secured to the end sill 2, by which construction the throw-bar is movable in a horizontal and in a vertical plane. To the under side of the throw-bar is fixed a doubly wedge or diamond shaped cam-block 23 whose inclined faces are arranged to be engaged by a series of rollers 24 each mounted on a stud 25 fixed in a roller block 26, each block being pivoted at its center to a drum 27 loosely mounted on the main axle, the end of each roller block 26 being notched as shown. To one side of the drum are attached a number of flat springs, 28, one for each roller block, each spring being adapted to enter the notch in one end or the other of its respective roller block thereby holding the said roller block from turning on its pivot. When it is desired to swing any roller block on its pivot its spring is forced outward and the block turned by hand until the other end of the block comes opposite the spring, whereupon the spring enters the notch. As the studs, 25, are fixed to their respective blocks at one side of the pivoted points it will be observed that the rollers 24, will be at one side or the other of the central vertical plane of the drum, and may therefore be arranged to contact with either inclined side of the cam-block, 23, as desired.

To the drum 27, is fixed one part 29 of a clutch-coupling which is provided with a groove 30, as usual, the other part, 31, of the clutch being fixed to the shaft. The teeth, 32, of the clutch are ratchet formed, as shown, and into the groove 30 enters the lower end, 33, of a spring-metal slide plate, 34, moving in slideways 35 and 36, the former secured to the under side of the supporting beam, 37, while the latter is mounted on top of one of the side sills. The slide plate 34 is provided with a transverse slot, 38, into which enters the cam shaped end, 39 of a shifting lever, 40, pivoted at 41 on the side of the central supporting beam, the shifting lever being provided with a treadle portion 42, whereby the cam end 39 may be moved, in the slot, 38, thus moving the slide plate 34 in one direction or the other, which in turn shifts the drum longitudinally on the main axle and either couples or uncouples the clutch. In case the planter is moved backward, the ratchet shaped teeth on the clutch will permit the drum to remain stationary.

To the top of the throw lever 19 is pivoted a link, 43, which has two upward-extending lugs, 44, between which enters the T-headed end, 45, of a connecting lever 46 pivoted at 47 to a plate 48 hinged at 49 in a pair of ears, 50, fixed to the supporting beam 37. The rear end of the lever, 46, is provided with a plate 51, having two notches 52 and 53 for a purpose hereinafter explained.

On top of the link, 43, is placed an auxiliary link, 54, also pivoted at the same point, 55, to where the link is pivoted, the auxiliary link resting at one end on top of the T-headed end 45, of the lever 46 thereby retaining the latter in its place between the two lugs 44, yet permitting it to be withdrawn by swinging the auxiliary link to one side.

To the rear central portion of the supporting beam is pivoted a marking lever 56 arranged to swing in a horizontal plane so as to occupy a position at right angles to the normal direction of travel of the latter machine, and on either side of the latter. To the end of the marking bar 56 is attached a runner, 57, pivoted at 58 to move in a vertical plane whereby the runner may be used on either side of the machine.

To the top of the marking bar is attached a series of guide staples 59 in which moves a marker rod 60 provided with an upturned end 61 arranged to engage one or the other of the two notches 52 and 53 according to the side on which the marking bar is placed. The outer end of the marker rod 60 is connected by a link 62 to a marker arm 63 pivoted to the marking lever at 64 and movable in a vertical plane parallel to the length of the marker-bar. To the extreme outer end of the marker bar is secured a rope or cable 65 provided with a hook 66 which may be inserted in either of the two staples, 67, fixed at the front of the side sills, one on each sill, as will be understood from the drawings, whereby the marking bar is retained in a position at right angles to the machine.

The shoe beam, 7, is attached to a tongue, 68, to whose inner or rear end is hinged a link 69 attached to the front end of one arm, 70, of a bell crank pivoted at 71, to a notched segment, 72, fixed on the front end of the supporting-beam, the other arm, 73 of the bell crank being extended to form a hand lever 74, and provided with the usual spring lever 75, to engage the notches in the segment 72, whereby the inner end of the tongue may be raised and lowered or held in any desired position, thus raising or lowering the rear end of the shoes 8, and at the same time raising or lowering the front end of the throw-lever 19, whereby the cam-block 23 is raised out of contact with the rollers 24.

The operation of my machine may be briefly described as follows: The hoppers are filled with seed and the planter drawn along by the team in the usual manner, the main wheels rotating the main axle, and, when the clutch is closed, driving the drum, whose rollers contact with the cam-block and move it to one side or the other according to the position in which the roller blocks are placed. In the particular machine illustrated there are four rollers, and if these be placed alternately at either end of the drum the cam-block will move alternately in one direction and then the other making four movements for one revolution of the wheels, whereas if two adjacent rollers be placed at one end of the drum and two at the other the block will be moved once in each direction, or make two movements during one revolution of the wheels. As the cam-block is moved the throw-bar is also operated, thereby actuating the reciprocating-bar, and dropping the seed at each shoe, as will be plain from what has been said before. The marking rod is reciprocated by the lever 46 and in turn moves the marker arm once for every movement of the throw bar, this marking arm thereby making a transverse mark on the ground while the runner on the end of the marker-bar makes a furrow parallel to the path of the machine in which the shoe of the machine is guided at the next trip of the machine. The places where the transverse marks occur indicate the points at which the seed should be dropped. The driver seated on the machine can see the seed before it drops on account of the transparent back pieces in the shoe, thus being enabled to know that the machine is operating correctly, and that the seed is being dropped at the proper point.

The details of the operation will be so obvious as to need no further elaboration.

Having thus fully described my invention, what I claim as new, and desire to secure by Letters Patent, is—

1. The combination with a frame, of the wheels and their axle journaled therein, a drum adapted to be rotated from said axle, roller bars pivoted to the periphery of said drum and each provided with a notch at each end and at one end with a roller, springs mounted on the sides of said drum with their free ends in position to engage the notches in the ends of said roller bars, shoes and seed hoppers, mounted on said frame and provided with dropping devices, a lever pivoted to said frame at one end and connected at its other end to the seed dropping mechanism, and a wedge, mounted on the intermediate portion of said lever in position to be engaged by the rollers on said drum, substantially as and for the purpose described.

2. The combination with the frame, of the wheels and their axle journaled therein, shoes and seed hoppers mounted on said frame and provided with seed dropping mechanism, an operating lever pivoted at one end to said frame and connected at its other end to the seed dropping mechanism, means for actuating said operating lever, a marking bar pivoted to the central portion of frame and adapted to be braced in position so as to project at right angles on either side thereof, a marker rod mounted in guides on said marking bar, a marker arm pivoted to the end of the marking bar, a link connecting said marker arm with said marker rod, a connecting lever pivoted on the frame and connected at one end to said marker rod, and a link, pivoted at one end to the operating lever and connected at its opposite end to the other end of the connecting lever, substantially as and for the purpose set forth.

In testimony whereof I affix my signature in presence of two witnesses.

GEORGE P. KUHN.

Witnesses:
WM. H. BODKER,
JOHN KUHN.